Patented Feb. 22, 1944

2,342,463

UNITED STATES PATENT OFFICE 2,342,463

PROCESS FOR THE MANUFACTURE OF VINYL ESTERS OF MONOCARBOXYLIC ACIDS

Heinrich Fischer and Adolf Freytag, Ludwigshafen-on-the-Rhine, Germany, assignors, by mesne assignments, to General Aniline & Film Corporation, New York, N. Y., a corporation of Delaware No Drawing. Application July 9, 1940, Serial No. 344,608. In Germany June 20, 1939

6 Claims. (Cl. 260—476)

The present invention relates to a process for the manufacture of vinyl esters of monocarboxylic acids.

We have found that vinyl esters of monocarboxylic acids containing at least 3 carbon atoms can be prepared in an advantageous manner by passing mixtures of dicarboxylic acids containing at least 4 carbon atoms together with acetylene at an elevated temperature, preferably at between 250 and 350° C. over basic reacting compounds of metals of the first or second group of the Periodic Table or of salts of the said metals with carbonic acid or organic acids as catalysts. Suitable dicarboxylic acids of the said kind are for example: Phthalic acid, naphthalic acid, hydrogenated phthalic acids and maleic acid. Instead of the said dicarboxylic acids, their anhydrides may be employed. In this case, however, provision must be made for the presence of as large an amount of water vapor as is necessary for the formation of the acids. Suitable catalysts, for example, are sodium hydroxide, calcium oxide, zinc oxide, cadmium oxide, zinc hydroxide, sodium zincate, zinc or cadmium acetate, potassium benzoate or zinc benzoate or mixtures or sulphonic acid salts of the said metals of the said substances. They may be used either in lump-form or precipitated on carriers. Suitable carrier substances, are, for example, active charcoal, pumice stone or silica gel.

The acetylene may be used either in pure state or in dilution with inert gases, such as nitrogen or carbon dioxide.

The process can be carried out at normal, slightly increased or under reduced pressure.

It is surprising that by the action of acetylene upon dicarboxylic acids vinyl esters of monocarboxylic acids are obtained. The reaction proceeds possibly with an intermediary formation of the monovinyl ester of the dicarboxylic acid, which is then transformed into the vinyl ester of the monocarboxylic acid while carbon dioxide is split off. This course of the reaction is made probable by the fact that when passing phthalic anhydride over zinc oxide at a temperature of 300° C. in a stream of nitrogen in the presence of water vapor, only 3 per cent. of benzoic acid are obtained, while under identical conditions in a stream of acetylene 60 per cent. by weight of benzoic acid vinyl ester are obtained.

The vinyl compounds obtained may be converted into valuable plastics by polymerization in known manner.

The following examples serve to illustrate how the present invention may be carried out in practice but the invention is not restricted to these examples.

Example 1

310 grams of phthalic anhydride and 90 grams of water are evaporated per hour in a stream of 2000 liters of acetylene and 1000 liters of nitrogen per hour. The resulting vapor mixture is passed over 10 liters of zinc oxide tablets at a temperature of 280° C. Within about 6½ hours 1220 grams of benzoic acid vinyl ester are separated by cooling with water from about 2000 grams of phthalic anhydride. The acetylene-nitrogen mixture is returned in a cycle while replacing the acetylene consumed by fresh acetylene.

In a similar manner benzoic acid vinyl ester is obtained from phthalic anhydride and water vapor with active charcoal impregnated with 5 per cent. of zinc acetate or with calcium oxide as a catalyst.

Example 2

1.02 grams of phthalic anhydride are evaporated in a stream of 20 liters of acetylene and 1.6 grams of water in a separate stream of 20 liters of acetylene each per hour whereupon the vapors are mixed and led at 320° C. over grains of pumice stone of from 4 to 6 mm. mesh-size containing 3 per cent of aluminium hydroxide, 15 per cent of zinc carbonate and 15 per cent of cadmium acetate. After 32 hours 15.7 grams of benzoic acid vinyl ester and 1.95 grams of phthalic acid were obtained. In a similar manner acrylic acid vinyl ester is obtained from maleic acid and valeric acid vinyl ester from adipic acid.

What we claim is:

1. A process of producing vinyl esters of monocarboxylic acids which comprises reacting in the vapor phase a dicarboxylic acid anhydride containing at least 4 carbon atoms and at least the equimolecular amount of water together with acetylene at a temperature from about 250–350° C. in the presence of a catalyst which comprises a basic acting compound of a metal selected from the group consisting of zinc, cadmium and calcium.

2. A process of producing benzoic acid vinyl ester which comprises passing in the vapor phase phthalic anhydride and at least the equimolecular amount of water together with acetylene at temperatures of about 250–350° C. over a basic acting compound of a metal selected from the group consisting of zinc, cadmium and calcium, said compound acting as a catalyst.

3. The process as in claim 2 in which the basic acting compound is zinc oxide.

4. The process as in claim 2 in which the basic acting compound is zinc acetate.

5. The process as in claim 2 in which the basic acting compound is calcium oxide.

6. The process as in claim 1 in which the reaction is carried out in the presence of nitrogen.

HEINRICH FISCHER.
ADOLF FREYTAG.